United States Patent [19]

Gardella

[11] 4,151,700
[45] May 1, 1979

[54] MOWING MACHINE FOR HARVESTING LONG STEM TEXTILE FIBER PLANTS

[76] Inventor: Adriano A. Gardella, 9/3 via della Sirena, Genoa, Italy, 16100

[21] Appl. No.: 787,066

[22] Filed: Apr. 13, 1977

[30] Foreign Application Priority Data

May 3, 1976 [IT] Italy ................................ 12610 A/76

[51] Int. Cl.² .................... A01D 37/04; A01D 45/00; A01D 55/18
[52] U.S. Cl. .................................... 56/13.7; 56/14.3; 56/14.5; 56/DIG. 15
[58] Field of Search ..................... 56/13.6, 13.7, 14.3, 56/14.5, 27.5, 119, DIG. 15

[56] References Cited

U.S. PATENT DOCUMENTS

| | | | |
|---|---|---|---|
| 2,645,074 | 7/1953 | Jones | 56/13.7 |
| 2,648,942 | 8/1953 | Grant et al. | 56/14.3 |
| 2,783,603 | 3/1957 | Smith | 56/119 |
| 2,793,486 | 5/1957 | Dietrich | 56/27.5 |
| 2,926,480 | 3/1960 | Kimball | 56/13.6 |
| 3,325,982 | 6/1967 | Fogels et al. | 56/14.3 |
| 3,462,927 | 8/1969 | Quick | 56/119 |
| 3,517,489 | 6/1970 | Alexandrino et al. | 56/13.7 |
| 3,550,361 | 12/1970 | Faxas | 56/13.7 |
| 3,599,404 | 8/1971 | Fernandez | 56/14.5 |
| 3,604,185 | 9/1971 | Reber et al. | 56/13.7 |
| 3,780,506 | 12/1973 | Tashino | 56/14.5 |
| 3,798,884 | 3/1974 | Middleton | 56/27.5 |
| 3,871,162 | 3/1975 | Schexnayder, Jr. | 56/14.3 |
| 3,911,651 | 10/1975 | Schreiber | 56/14.3 |
| 3,965,658 | 6/1976 | van der Lily | 56/295 |
| 3,972,159 | 8/1976 | Oosterling et al. | 56/295 |
| 4,009,557 | 3/1977 | Reicks | 56/14.3 |
| 4,037,666 | 7/1977 | Rath | 171/61 |

FOREIGN PATENT DOCUMENTS

| | | | |
|---|---|---|---|
| 636365 | 9/1936 | Fed. Rep. of Germany | 56/119 |
| 619708 | 4/1961 | Italy | 56/119 |

Primary Examiner—Russell R. Kinsey
Assistant Examiner—Paul J. Hirsch
Attorney, Agent, or Firm—Larson, Taylor and Hinds

[57] ABSTRACT

A mowing machine adapted for use in harvesting long stem textile fiber plants such as kenaf (*Hibiscus cannabinus*), comprises a lower cutting unit provided with counter-rotating cutting discs, mounted on a wheeled frame in front of the inlet of a sheaves-forming magazine, and insertion members which are operatively associated with the cutting unit effecting the mowing of the stems, for guiding and conveying into the said magazine the cut stems standing in a substantially upright position; the said magazine having one elastically yielding wall; sheaves-expeller means associated to said magazine, and adapted for intermittent operation upon a control from a sensor or feeler member, which continuously senses the size of a sheaf being formed in the magazine, and automatically controls the operation of said expeller means, whenever the sheaf being formed has reached a predetermined size, so as to expel or discharge the said sheaf.

9 Claims, 23 Drawing Figures

MOWING MACHINE FOR HARVESTING LONG STEM TEXTILE FIBER PLANTS

BACKGROUND OF THE INVENTION

In the initial processing of vegetable textile fibers of the kind comprising kenaf, jute, roselle, hemp and like fibers, it was found convenient to combine the mowing and the decortication or scutching operations directly on the field of the plantation. The main advantage as afforded by this combination is, as known, that the operation of decorticating green plants on the field, i.e., the stripping of the plant stem fibrous rind off its wooden core, permits the retting of the rind only. Therefore, mowing and decorticating machine combinations have already been developed in order to directly proceed to the decortication of the stems, as the stems are being cut by the cutting members of the mowing machine.

Now, there are mowing machines which, as such, operate in a manner which is satisfactory per se. Decorticating machines are also known, which afford very good features as to quality and efficiency. However, when a mowing machine is associated to a decorticating machine, to effect a decortication on the field, or decortication in line, of the just mowed green stems, problems arise in the operative interlocking between the two thus associated machines. The mowing machine actually yields an output of cut stems which is continuous but quite fortuitous as to order and intensity, while for a good operation of the decorticating machine it is required that the mowed stems be fed to it in a discontinuous manner, and in the form of small sheaves which are preferably supplied endwise to the passageway or throat leading into the decorticating cylinders, i.e., with the stem tips directed forwards.

SUMMARY OF THE INVENTION

The present invention solves the problem of such an operative interlocking by the provision of a mowing machine which is particularly adapted for the picking of textile fiber plants having elongated stems, such as kenaf and the like, and in which, according to one of its main characteristic features, there is provided insertion means operatively correlated with cutting means to, guide and push the stems as they are cut while maintaining them in a substantially erect position, into a sheaves-forming magazine having at least one yielding wall, and preferably one elastically yielding wall; and sheaves-expeller means are associated to said magazine and are dependent for their operation upon a sensor which senses the size of the sheaf in the sheaves-forming magazine and automatically promotes their action for ejecting a sheaf, every time a sheaf has reached a predetermined size, so as to expel or discharge this sheaf and to possibly feed it directly to a decorticating machine associated to the mowing machine.

The present mowing and sheaves-picking machine solves the problem of an operative interlocking between the mowing and the decorticating machines in the initial processing of vegetable textile fibers of long-stem plants, directly on the field of the plantation.

BRIEF DESCRIPTION OF THE DRAWINGS

The main and accessory features of the invention, the developments of its leading principle, and the multiplicity of the advantages arising therefrom will in any case become clearly apparent from the following detailed description of some preferred embodiments of the same, which are disclosed by way of non-limiting examples and by referring to the accompanying drawings, in which.

DESCRIPTION OF THE PREFERRED EMBODIMENTS

In FIGS. 1 to 4, reference numeral 1 generally denotes a mowing and sheaves-picking machine according to the present invention, which is designed for being pulled and driven by a tractor. The said machine 1 is mounted onto a pair of wheels 2 and comprises at one of its sides a steering assembly 3 (see FIG. 5) for its coupling to a tractor. In said machine 1, the whole mowing unit is designated by 4, while 5 denotes the associated magazine for the forming of sheaves of stems, e.g., of kenaf stems, said magazine standing at the back of the machine.

The mowing assembly 4 (see for example FIG. 4) comprises at its lower end a mowing unit 6 for cutting off the stems at their bottoms, and at its upper end comprises a similar stem-trimming unit 7 for cutting off the tips of said stems.

Figure 4:
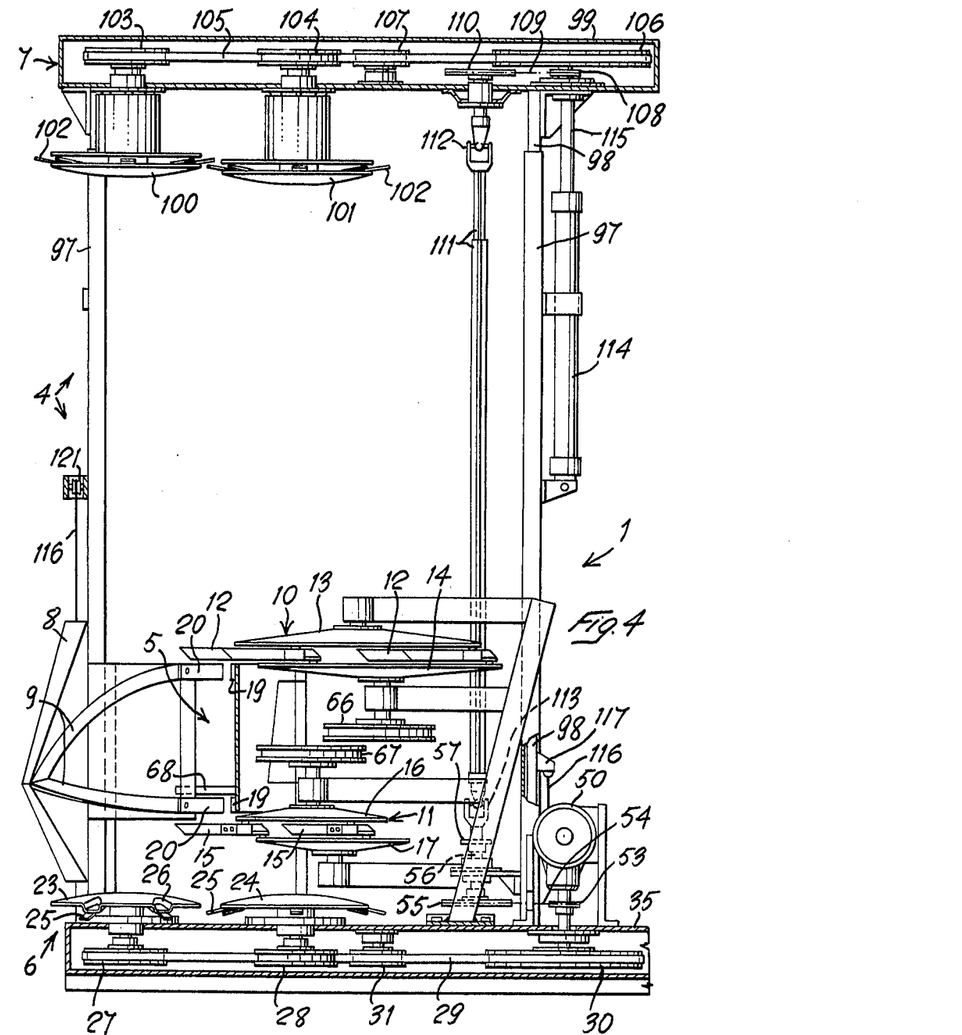
FIG. 4 is a front view of the mowing machine of FIG. 1, with parts being shown open or in a vertical section, for the sake of a clear illustration.

At its forward end the machine has a pair of triangularly shaped side plates 8, onto the inner sides of which there are fixedly secured the lead-in guides 9 that converge in the direction of magazine 5, towards which the stems are pushed by two superposed insertion units 10 and 11. Referring particularly to FIG. 4, the upper insertion unit 10 consists of a plurality of reel members 12 which are fitted in an articulated parallelogram assembly between a pair of driving discs 13 and 14 arranged with their axes extending vertically, and supported with their shafts in a suitably offset relation. In an analogous manner, the lower insertion unit 11 comprises a plurality of reel members 15, which are similarly assembled between their relative discs 16 and 17.

The said reel members insertion units are operated in the manner to be described hereinafter, and are driven into rotary motion at the same peripheral speed.

The interspace between the pointed ends of side plates 8 defines the width of the mowing machine pass zone on the land of the plantation to be mowed, and the feeler roller 18 which is mounted onto one side of the forward end of the machine, prevents the machine from fortuitously picking up any kenaf having been already cut down during the preceding pass.

The magazine 5 (see, for example, FIGS. 1 and 5) constitutes one of the main characteristic features of the machine according to the invention, and this magazine consists of a space which on its one side is delimited by a pair of rigid guides 19, while on its other side is delimited by a pair of elastically yielding guides 20, both said guides being provided as an extension of their respective leading-in guides 9.

On the outlet side of this sheaves-forming magazine, the machine comprises two sheaves-accompanying sidewalls 21 and 22 which delimit the space within which a sheaf F being vertically formed in magazine 5 falls down so as to lie horizontally.

The forming of sheaves F in the yielding wall magazine 5 and the discharge of the sheaves from said magazine are fundamental operations of the machine according to the invention, and will be illustrated and described in detail below after having completed the overall description of the machine construction.

After the engagement of stems K by the upper insertion unit 10 there follows, in a closely timed relationship, the cutting of stems K by the moving unit 6 located and operating a little below the lower insertion unit 11, which contributes to the pushing-in of the just mowed stems.

The mowing unit 6 consists of two counter-rotating discs 23, 24 arranged with their axes extending vertically, and each disc carries on its periphery a number of cutting blades 25 which are pivotally mounted with some play onto the disc, and radially project beyond the periphery of the disc under the effect of the centrifugal force, when the disc is entrained in its operative rotation.

Figure 8:
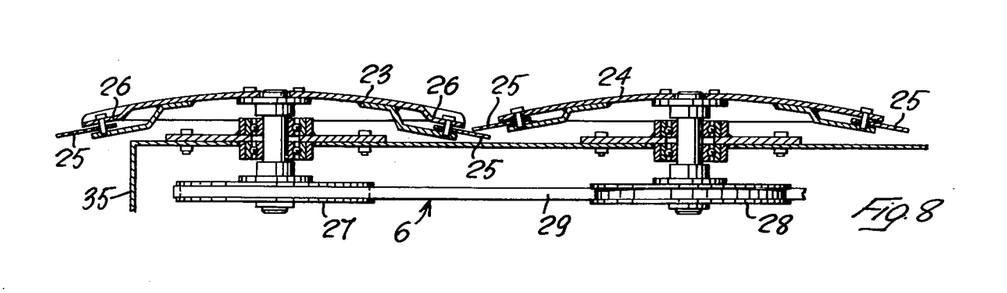
FIG. 8 is a partial view in vertical section, which shows in a different scale the set of the mowing or cutting discs, fitted with swinging blades, of the mowing machine in FIG. 1.

The assembly of blades 25 so as to permit their swinging is quite visible in the detail of FIG. 8, from which it appears that the counter-rotating discs 23, 24 have a cap-like, or in any event an upwardly curved shape. Such a shape helps in guiding the cut stems to the throat leading into the magazine for forming the sheaves F. Substantially, the discs 23, 24 are coplanarly set side by side so as to have a gap defined therebetween, in which the trajectories of their respective blades 25 come to be in an overlapping relation. To avoid the substantial coplanarity of the two discs 23 and 24, and therefore a possible interference of their blades 25, the periphery of one of said discs, for example of disc 23, has depressed portions 26 formed in correspondence of each one of its blades 25, so that these blades operate in staggered relationship with respect to the blades on disc 24.

Figures 9, 21:
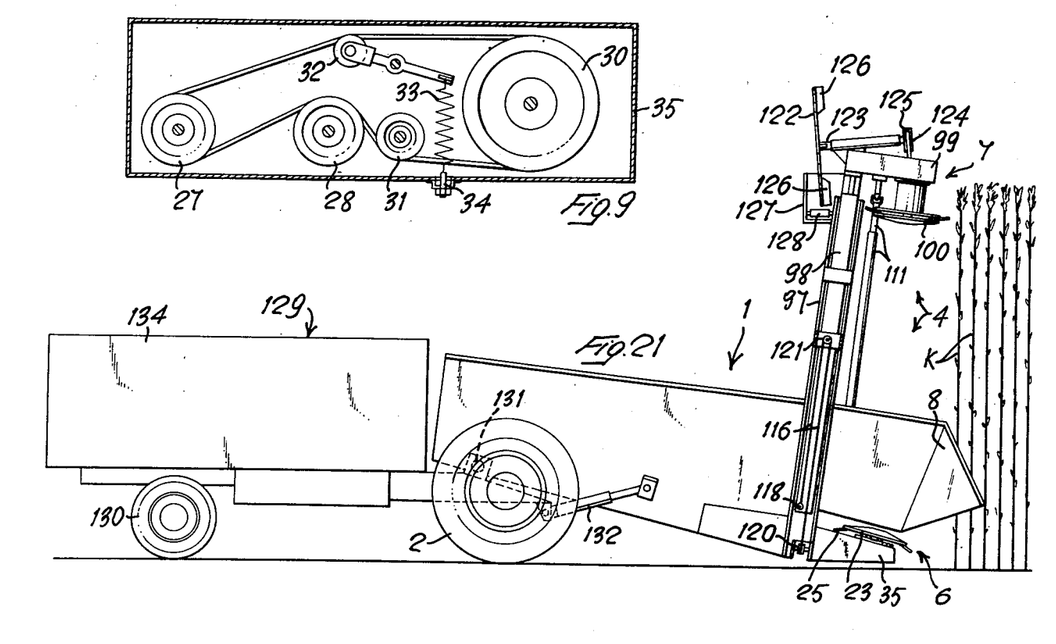
FIG. 9 is a plan section view of the arrangement for transmission of the rotary motion to the shafts of the mowing discs fitted with swinging blades.
FIG. 21 is a side elevational view of the mowing and decorticating machine, as shown in FIG. 20, in working disposition on the field of the cultivation.

Referring to FIGS. 4 and 9, the two discs 23 and 24 are operated through respective pulleys 27, 28 by a belt transmission 29 which is driven into rotation by a main driving pulley 30, and is led over an idle pulley 31 and a belt-tensioning roller 32 which is biased by a loading spring 33 which is adjustable by means of an adjusting screw 34, the whole being enclosed within a protective casing 35 integral to the machine-carrying frame.

Still according to the invention, the steering assembly 3 (see FIGS. 5, 18 and 19) comprises a tow beam 234 which is pivoted in 235 onto a sleave 236 shaped like a triangular box, with the beam at its apex, the base side of the box being hinged at 37 to a bracket 38 which is secured to the machine forward section, in correspondence of the location of the frontal assembly of the feeler roller 18. In sleeve 236, the beam 234 can be locked in working position or just in the position for the machine transfer, respectively by means of pins 39 and 40.

Figure 18:
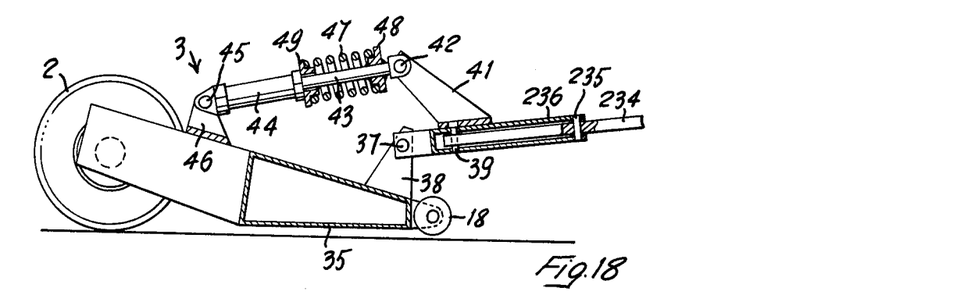
FIG. 18 is a part-view in longitudinal section, which shows the mowing machine steering assembly according to the tractor-pulled and power takeoff-connection embodiment, the steering assembly being shown in its arrangement for an operative towage on the field to be harvested.
Figure 19:
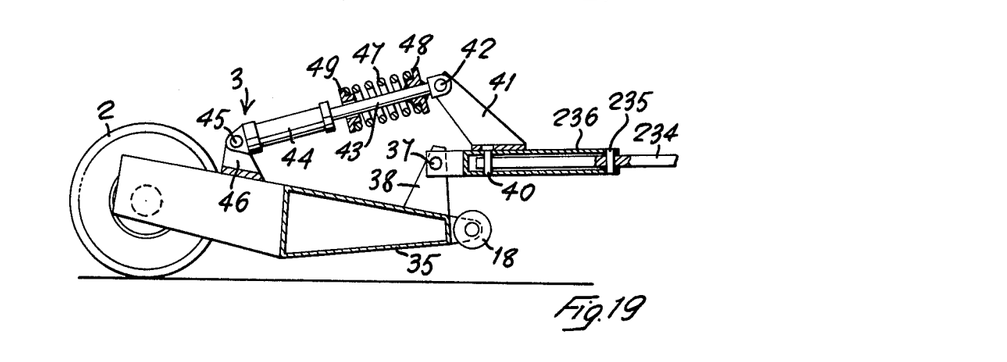
FIG. 19 is a view similar to that of FIG. 18, however with the steering assembly being shown in its position for simply drawing the machine when transferring the said mowing and decorticating machine by towing it.

In its turn, the sleeve 236 has a bracket 41 secured onto its upper part, and to this bracket there is hinged in 42 the head of piston rod 43 of an oledynamic cylinder 44 which is hingedly connected in 45 to a further rear bracket 46 which is secured onto the machine frame.

The relative movement between cylinder 44 and rod 43 is opposed by the helical spring 44 which is fitted onto this rod and acts between the collar 48 which is welded on rod 43 close to the articulated joint 42, and the suitable collar 49 loosely fitted on said rod 43.

When the cylinder 44 is de-activated (FIG. 18), the spring 47 is loaded and acts as a spring suspension; the roller 18 feels the ground of the mowed plantation, and the tow beam 234 is locked in working position by pin 39, since the tractor must of course run sideways of the cultivated strip of land to be mowed.

When the cylinder 44 is activated (FIG. 19), the rod 43 is fully extended and thus the spring 47 is not loaded; the sleeve 236 is forced into a more horizontal position, so that the roller 18 is lifted up from the ground. Thus, with the tow beam 234 locked in towing position by pin 40, the mowing machine 1 is ready for being transferred as a trailer.

The pulley 30 (see FIGS. 4 and 5) which drives into operation the lower cutting discs 23, 24 of the mowing unit 6, is keyed onto the output shaft of a speed-down gear 50 which through a universal joint 51 and a propeller shaft 52 is driven by the power takeoff of the tractor.

Onto the output shaft of the speed-down gear 50 (see FIG. 4), there is keyed not only the pulley 30 belonging to the mowing unit 6, but also a sprocket wheel 53 which through the associated endless chain 54 drives into motion the main gear wheel 55 of an upright spindle 56 from which it is derived the drive of the stem-trimming unit 7, to be described hereinafter.

Onto the spindle 56 (see FIGS. 5 and 11) there is also keyed a sprocket wheel 57 which through the endless chain 59 led over sprockets 60 transmits the driving to a sprocket wheel 58. The wheel 58 is keyed onto a shaft 61 carrying also the pulleys 62, 63 (see also FIGS. 3 and 13), which are keyed thereonto, and by means of respective belt drives 64, 65 are connected to pulleys 66, 67 respectively driving the disc 14 of the upper insertion unit 10 and the disc 16 of the lower insertion unit 11.

The diameter ratios of the interconnected pulleys 62, 66 and 63, 67 are so related as to equalize the peripheral speeds of rotation of discs 13, 14 and 16, 17 which due to technical and constructional reasons, are constructed of different diameters.

Since during the operation of the machine the rotation of the insertion units must be continuous, also the wheel 58 and its respective shaft 61 must be driven into a continuous rotation.

From shaft 61 is derived also the intermittent driving for the expeller device periodically discharging sheaves F from the sheaves-forming magazine 5, every time each sheaf has reached a predetermined size, as defined in term of stems per sheaf, and/or of said sheaf volume.

Figure 5:
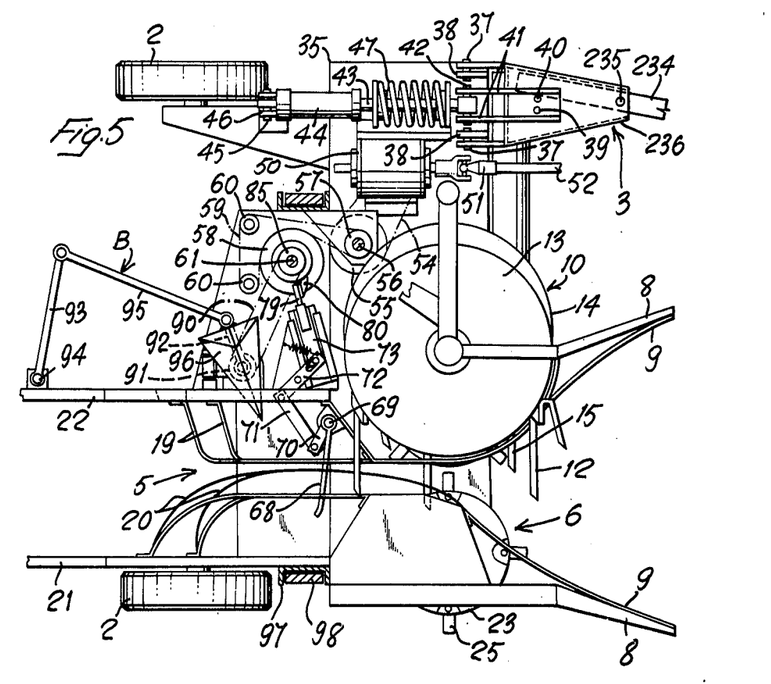
FIG. 5 is a sectional plan view of the same machine, which shows generally the mowing unit and the cut stems sheaves-forming unit.
Figure 6:
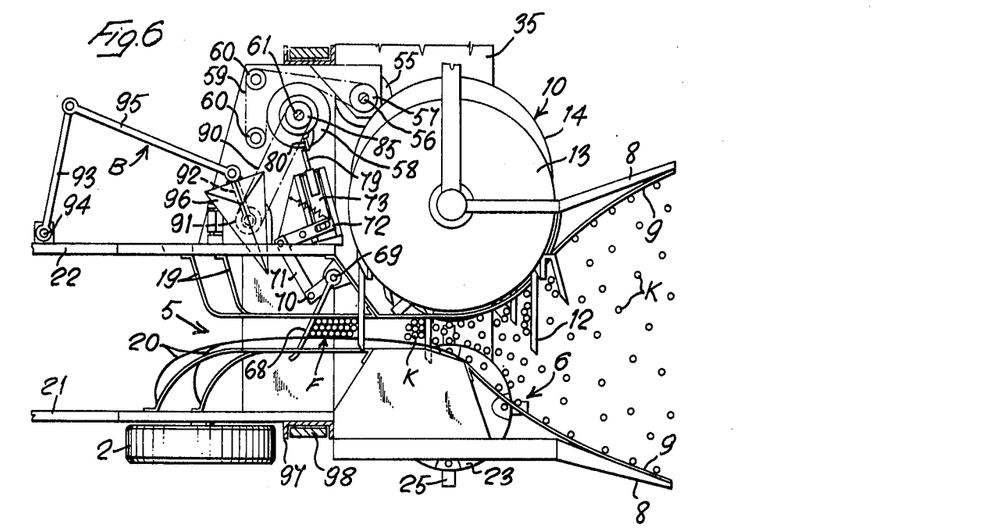
FIGS. 6 and 7 are plan views similar to that of FIG. 5, which show the machine in operation at the time of the mowing and the relative forming of one sheaf, and at the time of the ejection or discharge of a formed sheaf, respectively.
Figure 7:
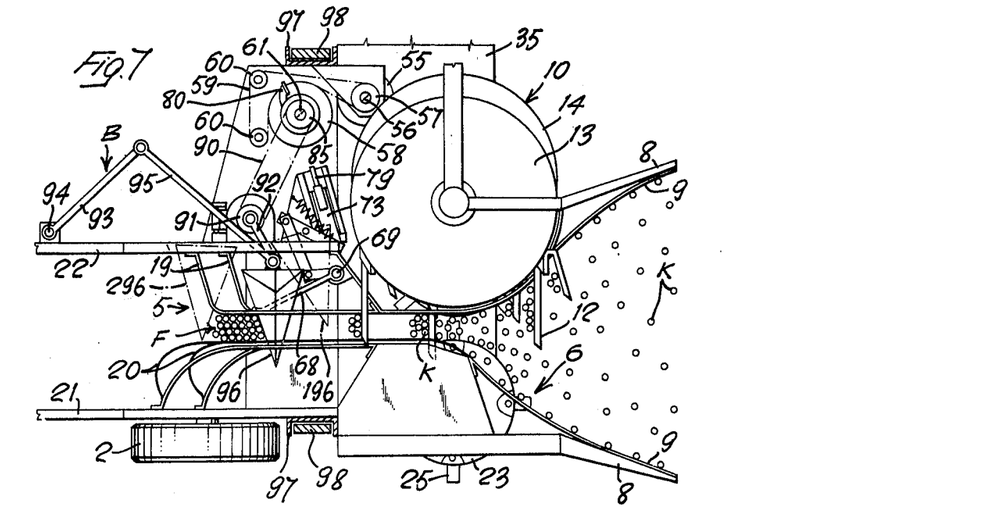
Figure 11:
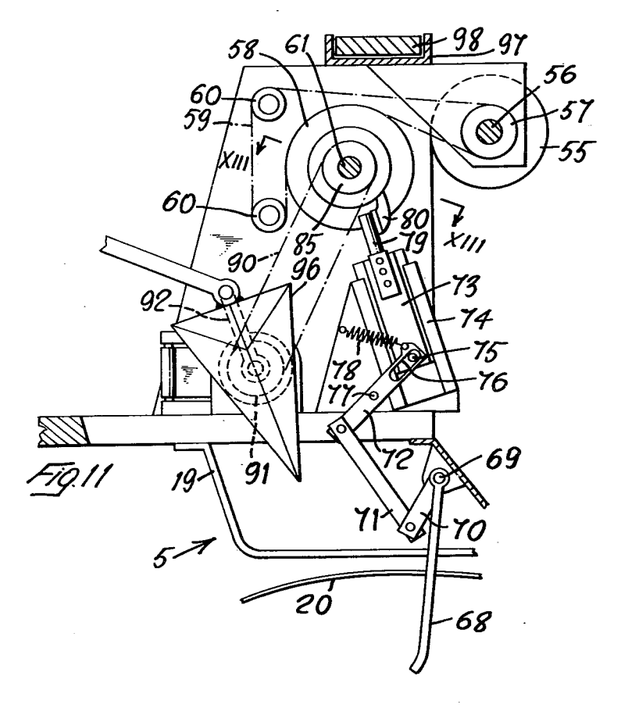
FIG. 11 is a partial plan view of the mowing machine, which shows the sensor sensing the size of the sheaf being formed in the yielding wall magazine, and the expeller member of the expeller means associated to said sensor.

The forming process of sheaves F in the sheaves-forming magazine, the constitution of the relative expeller device, and its intermittent operation will be now described generally by referring particularly to FIGS. 5 through 7 and to FIG. 11.

Upon forward movement of the machine, the stems K of Kenaf or any like plant, sugar cane not excluded, are engaged by the upper reel members 12 which guide them into the cutting zone, whereat first the said stems preferably have their apical tuft taken off by the stem-trimming unit 7, and are then cut off at their bottom by the mowing unit 6. The cut off stems are then engaged also by the lower reel members 15 and in substantially upright position are pushed into magazine 5. During this stage, the pushing action of the upper and lower reel members is implemented by the conveying action of the counter-rotating discs 23, 24 of the mowing unit 6, which with their convex upper surface tend to lead the just cutoff stems towards the middle of the machine, in correspondence of the inlet of magazine 5.

In said magazine 5, the stems pressed between the rigid guides 19 and the deformable guides 20, maintain such an upright position.

In the magazine a sensor means includes a sheaves-feeling lever arm 68 which extends across from one side to the other of same, and is pivoted in 69 to the machine frame. This sensor means is part of a sheaf lever system which includes at one end feeling lever 68, and at its other end a locking and unlocking member including abutment 79. To describe this system in more detail, through the linkage 70, 71, 72, arm 68 acts upon slide 73 which is slidable in guides 74. More particularly, a pin 75 on the rear of slide 73 is slidably engaged in a longitudinal slot 76 in lever arm 72 which is approximately intermediately fulcrumed in 77 to the machine frame, and is associated to a return spring 78 which, when no sheaf F is being formed in magazine 5, holds the feeling arm transversely across the magazine as shown in FIG. 11.

Figure 13:
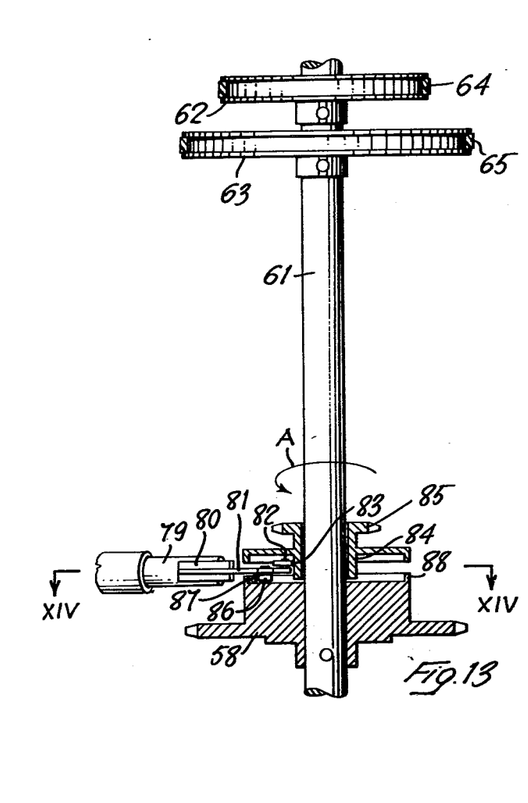
FIG. 13 is a partial view, in a section taken on line XIII—XIII of FIG. 11, which shows the device actuating the expeller upon trip control by the sensor.

Onto the slide forward end, i.e., onto the side lying opposite to pin 75, there is mounted, so as to project therefrom, an abutment member 79 which in the waiting position shown in FIG. 6, intercepts the circular path of the ledge 80 of a rocker arm 81 (see FIGS. 13 and 14) which is fulcrumed as in 82 to a lug 83 extending radially from hub 84 of a sprocket wheel 85 fitted on shaft 61. As will become clearly apparent hereinafter, this wheel drives the formed sheaves expelling device, with a driving cycle involving only one turn of the driving wheel 85. Upon control of the feeling arm 68, this turn is effected as follows. Elements 80–89, as shown in FIGS. 13 and 14 and as described in greater detail below form a trip device for cyclically activating the expeller.

When the magazine is empty, the position of the feeling arm 68 and the associated linkage connected to the locking rocker arm 81 is, as already mentioned, the one shown in FIGS. 5 and 11. As the magazine is gradually filled with stems K forming a partial sheaf, the sheaves-feeling arm 68 swings in the clockwise direction towards the left-hand side of FIG. 6, in response to the gradual increase of sheaf F with which it is being held into contact owing to the loading spring 78, so that the projecting abutment member 79 on slide 73 gradually disengages the ledge 80 on rocker arm 81. Up to the moment in which such a disengagement is completed, the tapped wheel 86 (see FIGS. 13 and 14) of rocker arm 81 does not engage the keying notch 87 peripherally formed in the annular flange of the hub of gear wheel 58, which is integral to the continuously rotating shaft 61. Thus, shaft 61 freely rotates in hub 84 of wheel 85 that drives into motion the expeller mechanism.

Figure 14:
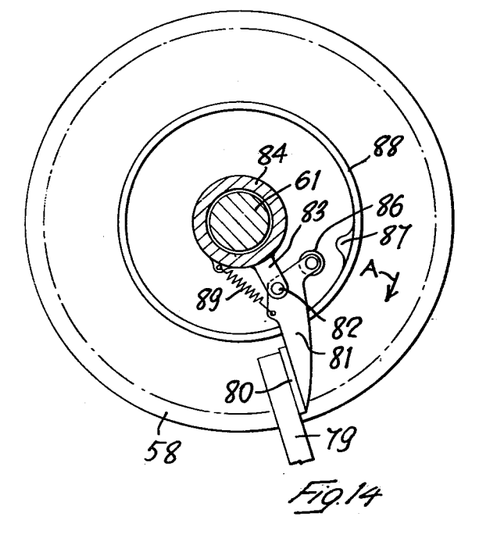
FIG. 14 is a section taken on line XIV—XIV in FIG. 13, which emphasizes the mechanism for releasing and locking the drive wheel in the device for actuating the expeller.

However, as soon as the abutment member 79 has fully disengaged the rocker arm 81, this latter, urged by spring 89, snaps into the position in which its tappet wheel 86 can roll into and against the flange 88, until it abuts against notch 87 owing to the rotation of wheel 58 in the direction shown by arrow A in FIG. 14. By this abutment, the wheel 85 is temporarily rendered integral to shaft 61, so as to drive into operation the intermittently working mechanism which automatically and sequentially discharges from the magazine the sheaves which have been formed according to a predetermined size.

The drive is imparted through the endless chain 90 (see FIGS. 5, 6 and 11) by the gear wheel 85 to the gear wheel 91 which entrains in rotation a crank arm 92 of a linkage B in which a second crank arm 93 swings about a fixed point 94, the said crank arms 92 and 93 being interconnected by a connecting rod 95 which carries the proper expeller member 96. The said expeller can be thus given a suitable motion of rotation and translation and oscillation so as to be caused to engage the completed sheaf F in the magazine and to shove it out of the magazine outlet, tipping it down to a horizontal position.

The dash-and-dot contours 196 and 296 show in FIG. 7 the inlet and outlet positions of the expeller member 96 in its operative run through the magazine in the formation of the sheaves F of kenaf or the like. The gear wheels 85 and 91 have an equal number of teeth, so that the chain 90 achieves a unitary velocity ratio between them. Thus, since the entire working cycle of the expeller member 96 obviously involves one complete turn of wheel 91, also the wheel 85 which is rigidly coupled to wheel 58, due to rocker arm 81 engaged in the indentation 87 (see FIGS. 13 and 14), shall correlatively make one turn.

In fact, as the expeller member 96 engages a sheaf from the rear and shoves it to the discharge, the feeling arm 68 slides laterally on one side of the sheaf which is being ejected (FIG. 7). However, as soon as this sheaf has passed, the feeling arm 68 immediately swings backwards into its waiting position (FIG. 11) and thus the abutment member 79 is once more returned into its position for intercepting the ledge 80 of rocker arm 81. Thus, upon completion of the positive rotation by one turn of wheel 85, the rocker arm 81 will be disengaged from notch 87. Therefore, the wheel 85 will no longer be engaged in rotation with the wheel 58, but will remain idle on the rotating shaft 61, while this shaft is continuing to rotate, to wait for the subsequent discharge control by the next finished sheaf, which again shifts the feeling arm 68.

Figure 12:
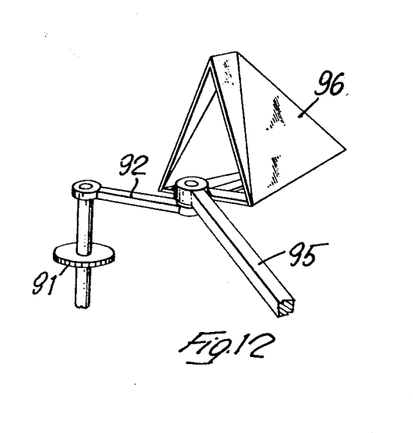
FIG. 12 is a perspective view illustrating a detail in the shape of one embodiment of the expeller member as shown in FIG. 11.
Figure 12A:
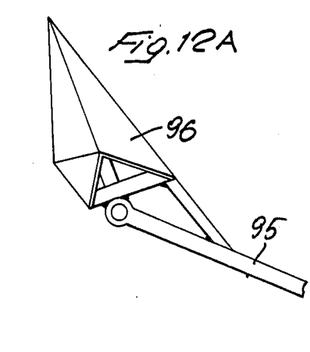
FIGS. 12A and 12B show respectively in plan and in a perspective view a modified embodiment of the expeller member in the expeller device discharging one by one the sheaves formed in the collecting magazine provided with a deformable wall.
Figure 12B:
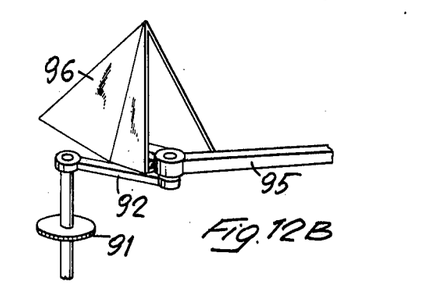

The expeller member 96 preferably has the tri-dimensional polyhedric shape as shown in FIGS. 12, 12A, 12B. Such a shape, however, is not to be considered as limiting the invention.

The stem-trimming unit 7 (see for example FIGS. 3 and 4) is arranged onto the cross beam of a portal frame, which is erected with its upright members secured onto opposite sides of the mowing machine frame. These upright members are of the telescopic type and comprise each a channel 97 which is fixedly mounted onto the said frame, and a flat iron 98 which is slidable with some play in channel 97. Onto the slidable pair of flat irons 98 there is fitted like a cross piece the housing 99 in which the cutting or stem-trimming upper discs 100, 101 fitted with radially extending cutting blades 102, are rotatably supported. These discs are supported so as to extend downwardly from the underside of housing 99, and are arranged side by side so as to define a cutting throat therebetween, lying substantially in the vertical plane passing through the cutting throat of the underlying mowing discs 23, 24.

Figures 10, 15, 16:
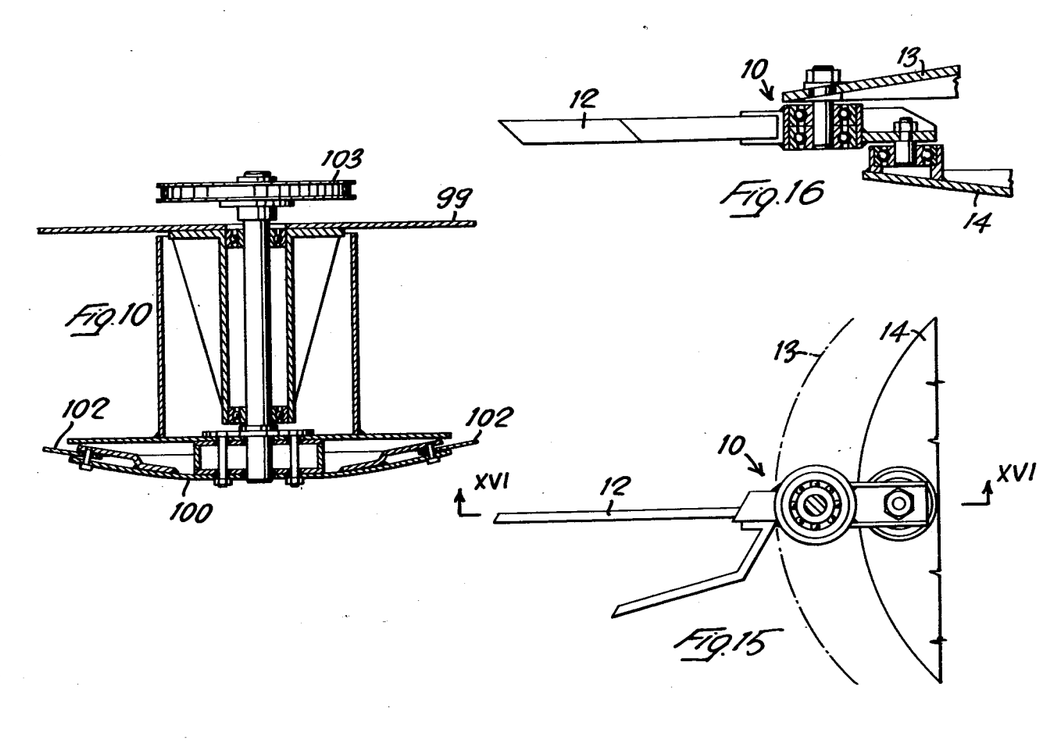
FIG. 10 is a detail in vertical section of one of the cutting discs of the upper cutting or trimming unit of the mowing machine, which unit acts to cut off the ends or tufts at the stem tops.
FIG. 15 is a plan partial-view illustrating a detail of one preferred embodiment of the insertion means, consisting of a plurality of reel members which are driven into a motion of rotation and translation along a closed path, and are fitted in an articulated parallelogram assembly between equirotating discs arranged with their shafts in an offset relation.
FIG. 16 is a view in a vertical section on line XVI—XVI of FIG. 15.

FIG. 10 shows in diametral section the detail of one (i.e., disc 100) of the stem-trimming discs cutting off the top ends of stems K. As it appears in this Figure, the radially extending blades 102 are freely swingably pivoted by means of pins which are regularly spaced apart along the periphery of the disc.

The said stem trimming discs 100, 101 are driven into a counter-rotation by respective pulleys 103, 104 (FIG. 4) and through a belt drive 105 which derives its motion from a main or driving pulley 106, with the interposition of an idle roller 107. Onto the spindle for entraining the said main pulley 106 in rotation there is keyed also a sprocket wheel 108 which through an endless chain 109 is connected to a second sprocket wheel 110 driven into motion by the already mentioned spindle 56, through a telescopic shaft 111 provided at both ends with universal joints 112, 113.

Figure 1:
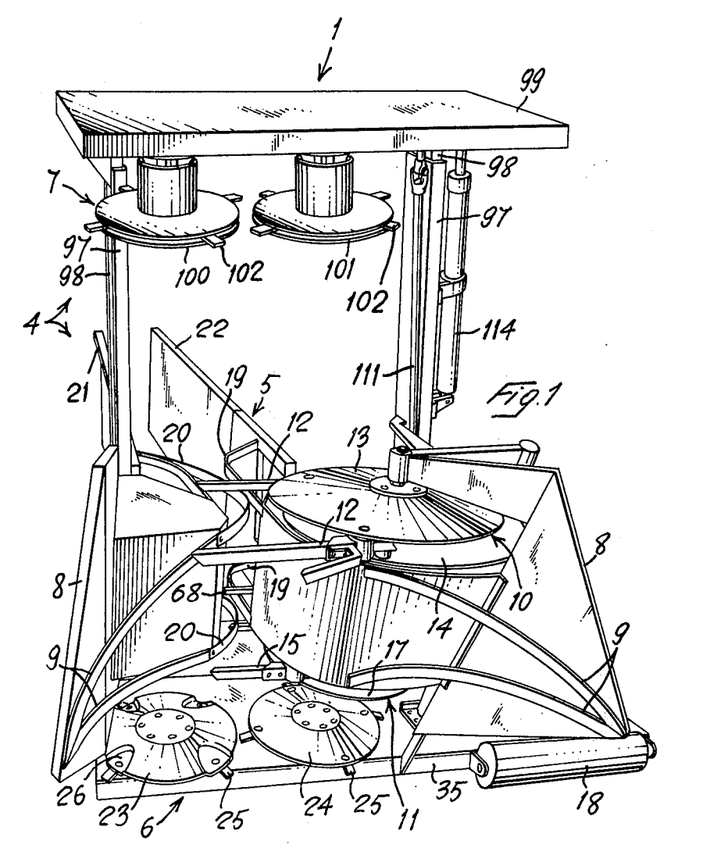
FIG. 1 is a perspective front view illustrating a mowing and sheaves-picking machine for high stem herbaceous plants, particularly for textile fiber plants such as kenaf and the like, in one embodiment which is adapted for being tractor pulled and driven.
Figure 2:
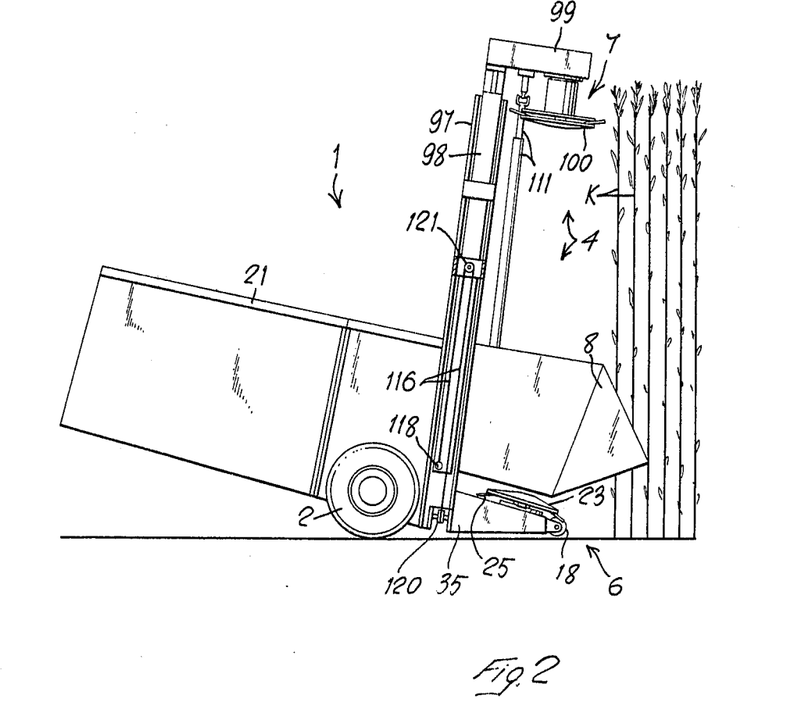
FIG. 2 is a side elevational view of the machine as shown in FIG. 1.

The adjustment in height of housing 99 carrying the trimming discs 100, 101, which adjustment is required for adapting the mowing machine to the different average heights of the stems to be mowed and trimmed at their top ends, is achieved by means of an oleodynamic cylinder 114 mounted onto one or each one of the fixed beams 97 of the variable height upright members, while the rods 115 in said cylinders abut against portions of the underside of the box-like crosspiece 99. When, as in the illustrated embodiment, one cylinder 114 is provided on only one side, it is convenient to provide a cable drive 116 from the shiftable upright 98 on the side of cylinder 114 to the upright 98 on the other side of the machine, in order to render the raising thrust on said upright symmetric, thus preventing any sticking or any other irregularities in the vertical shifts for adjusting the slidable portal frame supporting the stem ends trimming unit. This cable drive which is visible in FIGS. 2, 3 and 4, provides for the cable 116 to be retained at one end by the anchoring means 117 and at its other end by the anchoring means 118, and to be suitably led over at 119, 120, 121 on idle members which are integral to the corresponding channel uprights 97.

Figure 3:
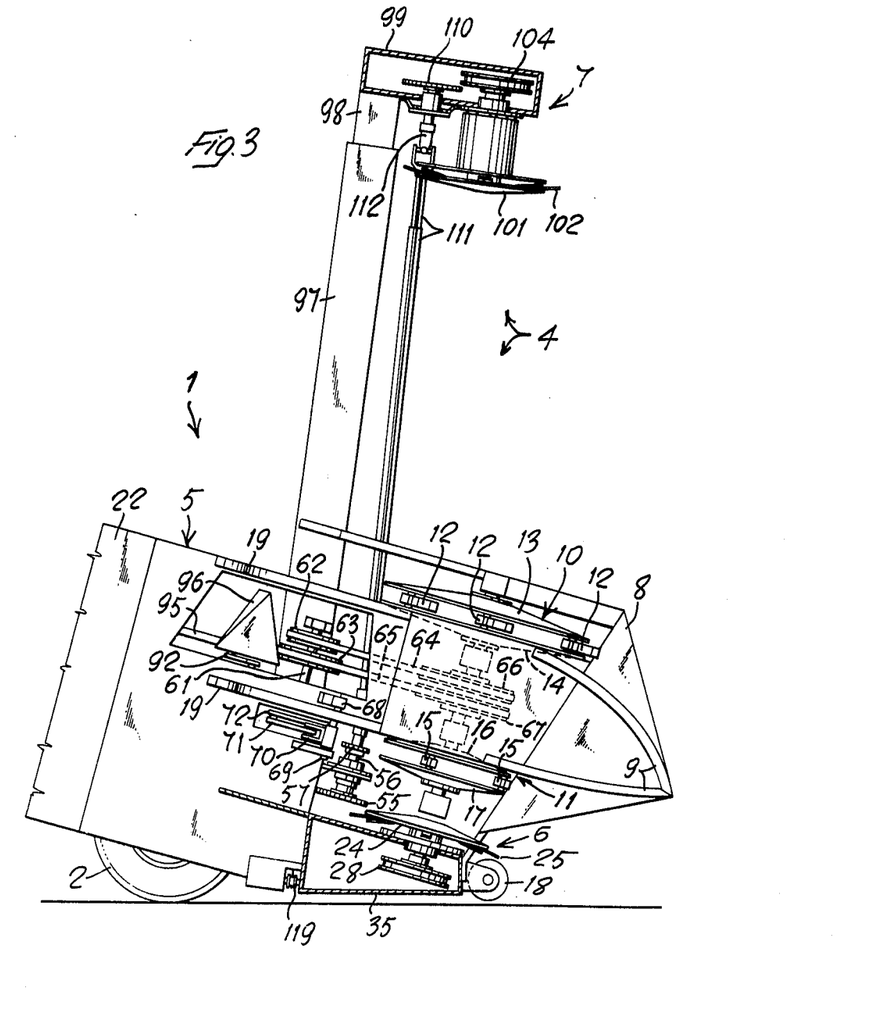
FIG. 3 is a side elevational sectional view of the mowing and sheaves-picking machine as shown in FIG. 1.

As it is clearly apparent in FIG. 3, when the machine is in its working position, the machine is inclined forward with respect to the horizontal by a small angle which might conveniently be around 15°, with the field-feeling roller 18 into contact with the ground. Thus, since the blades 25 in the mowing unit 6 are inclined by about 10° relatively to the axes of their respective discs 23, 24, the total obliqueness of the blades and therefore the slope of the corresponding stem-cutting units has a value which is around 25°. This obliqueness is found to be the optimum for the stem-cutting operation.

With the machine inclined forwards, i.e. in the direction of the mowing face, also the portal frame 97, 98, 99 comes to be forwardly inclined, so that the trimming upper discs 100, 101 begin to act shortly before the corresponding mowing discs 23, 24. This appears evident, for example by observing FIG. 2. Such an advance in the operation of the trimming upper discs is convenient in that the stem tips or ends can thus be cut off while the stems are still firmly fixed in the ground. If it is desired to provide a setting also for said advance, a forward-adjustable assembly of the portal frame box-like cross beam, which is designed by reference 99, might by provided. The practical realization of a mechanism for such an adjustment is a mere question of technical skill, and therefore it is not deemed necessary to show here any examples for illustrating it, since it is sufficient to mention the possibility and the usefulness of such a forward adjustment of the portal frame.

At this point, it is to be particularly noted that the annexed drawings form part of the present disclosure also for any details and features that have not been analytically described but which are readily visible and noticeable by one skilled in the art, on the basis of a simple survey of said drawings.

Figure 17:
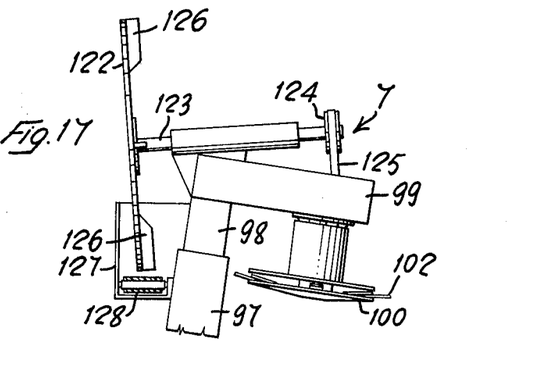
FIG. 17 is an elevational part-view of the upper part of the adjustable frame of the mowing machine, taken at the stem ends cutting or trimming unit provided with rotary cutting blades, and showing the blade equipped rotary crusher for the seeds removal and for a sideways discharge of the cutoff stem ends, and the seeds-collection belt conveyor for the collection and discharge of the seeds.

The upper cutting unit for the trimming of the stem tips can be advantageously completed with the seeds threshing and collecting mechanism, which is shown in the detail of FIG. 17. As it is known, at the time of harvesting the plants of kenaf or the like carry at their tips the capsules containing the seeds. The mechanism of the invention provides a seeds-threshing wheel 122 which is keyed onto a substantially horizontal shaft 123 rotatably supported onto the box-like cross beam 99 of the adjustable portal frame 97, 98, 99. Onto the same shaft the driving pulley 124 is keyed, which through the driving belt 125 is driven into operation by the same driving arrangement as for the trimming upper discs 100, 101.

On the side of the seed-threshing wheel 122 which is turned towards the trimming discs 100, 101 there is mounted a crown engagement of blades 126 against which the stem ends impact as they are cut off by said discs. The action of blades 126 upon the cut stem ends first of all promotes the breaking of the capsules containing the seeds, which fall down to the bottom of a collection box 127 inside which there runs in the transversal direction the discharge belt conveyor 128 which by being suitably driven conveys to a collection manifold (not shown) the thus freed seeds. At the same time, the stem ends thus deprived of the seeds are hurled radially outwardly by the blades 126 of wheel 122 which is driven in rotation at a high speed, so that the stem ends fall down to the ground, out of the working path of the mowing machine.

By the provision of the seed threshing and collecting device as described in the preceding paragraph, the operation of the machine is still more orderly, apart from the additional advantage of having a quantity of seeds collected which is more than sufficient for any subsequent seeding operations.

FIGS. 15 and 16 show some details of the assembly between the offset driving discs 13 and 14 of one of the reel members 12 in the upper insertion unit 10. These Figures will appear self-evident to one skilled in the art, and any detailed written exposition of same is therefore deemed non-essential.

The mowing machine so far described is particularly meant for a tractor-pulled operation, the tractor being provided with a power takeoff connector. The oleodynamic cylinders as indicated in the course of the specification may be connected to a cylinder-pressuring set provided on the mowing machine, or else they may be connected to a cylinder-pressurizing set on the tractor.

Figure 20:
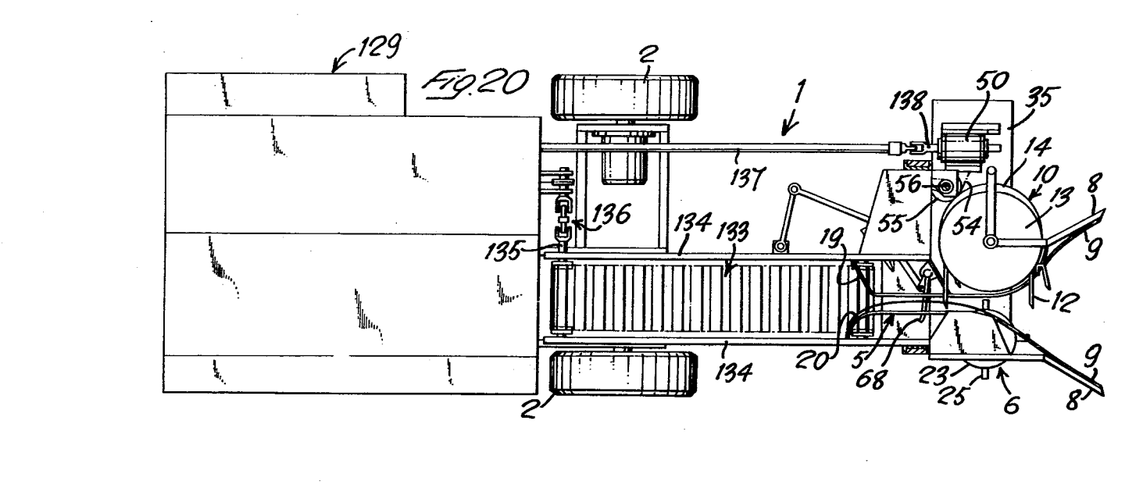
FIG. 20 is a plan view of one embodiment according to which the mowing machine is carried and driven by a self-propelled decorticating unit.

In one preferred, further embodiment of the mowing machine as shown in FIGS. 20 and 21, the same mowing machine can be combined with a decorticating machine in a self-propelled group wherein the decorticating unit 129 is mounted onto two axles provided with independent wheels 2, 130 and carries at its forward end the mowing unit 1 in a cantilevered manner. More particularly, as it appears evident in FIG. 21, the mowing unit 1 is hingedly mounted in 131, so that it can be swung into its working position, or into its machine-transfer position, by means of a pair of pistons 132.

The sheaves discharged from the sheaves-forming magazine in the mowing machine are caused to fall down, preferably with their tips in leading position, onto the conveyor 133 which runs between the sidewalls 134, and sequentially delivers same to the inlet of the decorticating rollers. The conveyor 133 is driven by the decorticating machine engine through the output shaft 135 and the double cardan joint 136, while the shaft 137 drives the mowing machine assembly at the other inlet 138 of the reduction unit 50, which preferably is an epyclic reduction gear. For the rest, the mowing machine is substantially like the machine as described with reference to the first embodiment.

From the foregoing disclosure, it is apparent that the invention provides as its main advantage and characteristic feature, a field mowing machine in which the problem is solved of an operative interlocking between the mowing and the decorticating machines in the mowing and decortication of textile fiber plants, particularly such as *Hibiscus Cannabinus*—commonly known as kenaf—and like plants, for which it is required that the cutoff stems be fed to the decorticating machine already composed into sheaves. Besides solving this specific problem, the invention proposes a characteristic method of mowing long stem plants, by cutting them between cutting discs fitted with counter-rotating blades, and according to which method the stems are kept standing in an upright position after their cutting, and are caused to advance orderly compacted transversely to their height, through a collection magazine where the array of stems is stopped and formed into a sheaf, and such a sheaf is periodically discharged from the magazine, to be thereafter fed directly to the inlet of the decorticating rollers of a decorticating machine associated to the mowing machine.

Although some preferred embodiments have been disclosed by way of example, it is to be understood that the invention is not strictly limited to same, but can be widely varied and modified in its practical application, without however departing from the leading principle of the same invention, as set forth above and as claimed hereinafter.

I claim:

1. A mowing and sheaves-picking machine particularly adapted for use in harvesting long stem textile fiber plants such as kenaf (*Hibiscus cannabinus*), jute, hemp, and roselle, comprising: a lower cutting unit provided with counter-rotating cutting discs for cutting the stems, said discs mounted on a wheeled frame, a sheaves-forming magazine and insertion members located rearwardly of said wheeled frame, said sheaves-forming magazine and insertion members being operatively associated with and positioned relative to the said lower cutting unit to guide and convey the cut stems into the said magazine in an array formation and standing in a substantially upright position; the said magazine having at least one yielding wall, a sensor means for continuously sensing the size of a sheaf being formed in the magazine, and a sheaves-expeller means operatively associated with said magazine for intermittent operation, upon control from said sensor means sensing when the sheaf being formed has reached a predetermined size, to automatically expel or discharge the said sheaf, said sensor means comprising a sheaf lever system having at one end a feeling lever and at the other end a locking and unlocking member, said sheaf lever system mounted such that it swings in response to the degree of formation of a sheaf in the magazine by means of contact of the feeling lever with a part of the sheaf, a trip device operatively associated with the said lever system to be tripped by the locking and unlocking member for cyclically activating the sheaves-expeller means, for the period of one discharge cycle of a sheaf from the magazine, said trip device comprising a lug and notch coupling between a shaft which is driven in continuous rotation and an actuating wheel which actuates said sheaf-expeller means, and which wheel is mounted on said shaft so as to normally stay idle thereon, said lug and notch coupling being operatively connected to said sheaf lever system to engage the coupling between said shaft and the said wheel every time the sensor means senses that a sheaf has been formed according to a predetermined size, and to automatically reset the lug and notch coupling to the disconnected condition upon completion of the expelling cycle, and a return means associated with the lever system to return the sensor means, when free from engagement with the discharged sheaf to its waiting position.

2. Mowing and sheaves-picking machine according to claim 1, which further comprises upper cutting means which are operatively associated with the lower cutting unit, for cutting off the tips or top ends of the stems.

3. Mowing and sheaves-picking machine according to claim 2 in which the said upper cutting means are mounted onto the cross beam of a portal frame fitted on the machine frame with the cross beam extending as a bridge over the lower cutting means, the said portal frame comprising adjustable upright members, whereby the height of the said upper cutting means is adjustable in relation to the height of the stems from which the tips are to be cut.

4. Mowing and sheaves-picking machine according to claim 1 in which the said lower cutting unit comprises at least one pair of rotary cutting discs which are substantially coplanarly mounted and are driven in rotation in opposite directions about parllel, substantially vertical shafts, each disc carrying a number of blades mounted on its periphery radially projecting from the disc itself and swingably pivoted by means of pins secured to said disc.

5. Mowing and sheaves-picking machine according to claim 4, in which the rotary discs have upwardly curved upper surfaces.

6. Mowing and sheaves-picking machine according to claim 1, in which the said insertion members comprise a plurality of reel members which are arranged according to an articulated parallelogram kinematic mechanism, between two driving discs having their shafts in a parallel and offset relation, which drive each reel member into a motion of translation along a closed circuit periodically interfering with the inlet to the magazine.

7. Mowing and sheaves-picking machine according to claim 1 in which the said sheaves-forming magazine comprises a space in which the stems inserted by the reel members are received and held in an erect position, the said space being delimited between opposite guides which at least on one side of the same magazine are elastically yielding.

8. Mowing and sheaves-picking machine according to claim 1, in which the sheaves-expeller means comprises at least one expeller member and an actuating means cyclically driving it in a closed path operative run.

9. Mowing and sheaves-picking machine according to claim 1, designed for being tractor pulled and driven, and provided with a steering assembly arranged on one side of the lower cutting unit frame, and comprising an epyclic reduction gear for connection to the power takeoff of the tractor, the said reduction gear being operatively connected to the machine to operate the whole assembly of the operative units of the machine.

* * * * *